United States Patent [19]

Satyanarayana

[11] 3,864,581

[45] Feb. 4, 1975

[54] SHOCK PREVENTION DEVICE

[76] Inventor: Varahur Srinivasa Satyanarayana, 38C Irwin Rd., New Delhi, India

[22] Filed: Jan. 22, 1973

[21] Appl. No.: 325,419

[52] U.S. Cl. .................................... 307/92, 317/18

[51] Int. Cl. ............................................ H02h 3/16

[58] Field of Search ............. 317/18 A, 18 C, 18 D; 307/92

[56] References Cited

UNITED STATES PATENTS

| | | | |
|---|---|---|---|
| 3,214,638 | 10/1965 | Moser et al. | 317/18 D |
| 3,241,638 | 10/1965 | Moser et al. | 317/18 D |
| 3,407,337 | 10/1968 | Benham | 317/18 D |
| 3,492,533 | 1/1970 | Thurston | 317/18 A |
| 3,728,581 | 4/1973 | Adamo | 317/18 A |

*Primary Examiner*—David Smith, Jr.
*Attorney, Agent, or Firm*—Hammond & Littell

[57] ABSTRACT

A device for disconnecting a load from a power source upon a leakage occurring in said load and which comprises an energizing coil which actuates a first switch to connect the load to the power source and a transistor having a biasing means connected to said load and such that upon leakage in the load, the transistor is biased and thereby deenergizes the coil and the first switch is opened.

10 Claims, 4 Drawing Figures

SHOCK PREVENTION DEVICE

PRIOR ART

Various constructions of electrical shock prevention devices are as such known in the art. All such known devices employ or incorporate the use of a differential transformer adapted to be connected to a load and such that upon a leakage occurring in the load, the differential transformer is in an unbalanced state resulting thereby in a generation of a signal. The signal is amplified by means of an amplifier and thereafter actuates a control circuit such as to disconnect the load from the main power source through the differential transformer.

Certain inherent disadvantages are associated with such known circuits. One such disadvantage is the cost factor of the device. Due to such a considerable cost factor, it is necessary to provide a single device for a plurality of load circuits and for which purpose the device is connected directly to the main power source. Thus, if a leakage occurs in the conductors connecting the load from a distant point to the device, the presence of such a leakage, though not dangerous, would still actuate the device and thereby disconnect all the loads from the main source. Another disadvantage is that if a defect occurs only in one particular load, such a defect in one load would actuate the device and thereby disconnect all the loads from the main source. Such an actuation of the device is often inconvenient particularly when no defect occurs in the remaining loads, but which are still disconnected from the main source, due to a defect occurring only in one particular load. Furthermore, when a plurality of loads are connected to the device, and a defect occurs in one particular load, the defective load cannot then be easily identified.

OBJECTS OF THE INVENTION

An object of this invention is to propose an electrical shock prevention device which obviates the disadvantages of the prior art.

A further object of this invention is to propose an electrical shock prevention device which avoids the use of a differential transformer.

A still further object of this invention is to propose an electrical shock prevention device which is cheap in original costs.

Another object of this invention is to propose an electrical shock prevention device which is sensitive.

BRIEF DESCRIPTION OF THE INVENTION

According to this invention, there is provided a device adapted to disconnect a load from a power source upon a leakage occurring in said load comprising an energizing coil adapted to be connected to a mains source, a first switch capable of being closed upon the energization of said coil and thereby connecting a load to the power source, a transistor connected to the energizing coil and having a biasing means, said transistor and biasing means adapted to be connected to the load and such that upon a leakage occurring in the body of the load, the transistor is biased and thereby deenergizes said coil and whereby said first switch is opened.

In accordance with this invention, a second switch is connected between the energizing coil and the phase terminal of said device and whereby upon actuation of the second switch, the first switch is closed. The second switch is a push button switch. Further, in accordance with this invention, a third switch is provided in parallel to said second switch, said second switch being normally closed and connected between the energizing coil of said first switch. Further, a reversing switch is provided at the input terminals of said device, and an indicating means, such as a bulb, is provided with said reversing switch.

In accordance with another embodiment of this invention, there is provided means for preventing a shock to a human body upon contacting a live conductor of the load and which consists of a current transformer connected to said first switch, the secondary of said transformer connected to said transistor through a second biasing means and such that said transistor is capable of being biased by said first and/or second biasing means and whereby the coil is deenergized and said first switch is opened.

In accordance with a still further embodiment of this invention, there is provided means for preventing a shock to a human body upon contacting a live conductor of the load and which consists of a first current transformer provided in the phase line, a second current transformer provided in the neutral line, the secondaries of said transformers connected to a balanced amplifier through a sensing means, said balanced amplifier connected to said first transistor through an emitter follower amplifier. The balanced amplifier consists of a first transistor for said first transformer and a second transistor for said second transformer.

In accordance with a still further embodiment of this invention, there is provided means for preventing a shock to a human body upon contacting a live conductor of the load and further comprising a first and second current transformer provided in the phase and neutral line respectively, a second transistor connected to the secondaries of said transformers through a second sensing means, said second transistor coupled to said first transistor and such that upon a leakage occurring in the conductor, the second transistor is biased. The secondary of said first transformer is provided in an opposed relation to the secondary of said second transformer.

BRIEF DESCRIPTION OF THE DRAWINGS

Further objects and advantages of this invention will be more apparent from the ensuing description when read in conjunction with the accompanying drawings and wherein.

DETAILED DESCRIPTION

Figure 1:
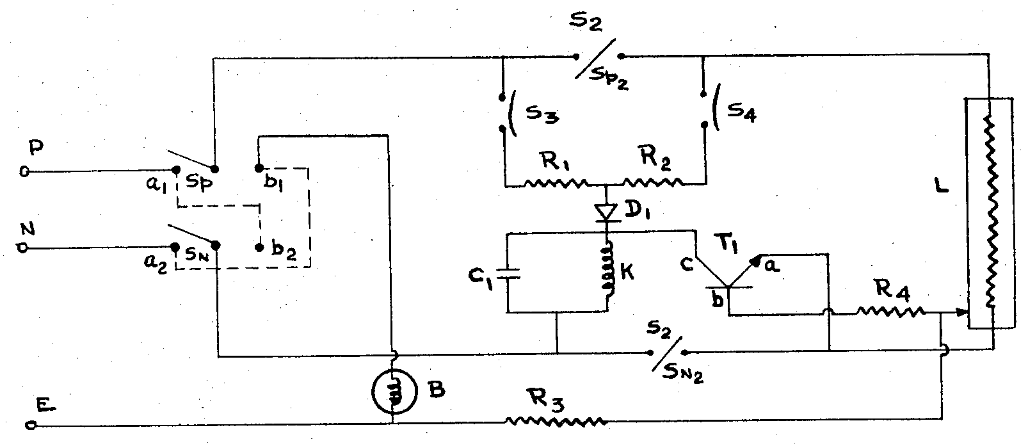
FIG. 1 shows one embodiment of the device of this invention.

Reference is at first made to FIG. 1 and which illustrates the circuit of a shock control apparatus adapted to be connected between the load and a power source. Upon a leakage occurring in the body of the load, the apparatus of this invention is adapted to disconnect the load from the main power source.

The device or apparatus of FIG. 1 consists of a switch $S_1$ having contact arms $S_p$ and $S_n$, and which, in an operable position, is adapted to establish a contact with the phase line P and neutral line N respectively. The arms $S_p$ and $S_n$ of switch $S_1$ are adapted to be connected to a second switch $S_2$ also having arms $S_{p2}$ and $S_{n2}$. Switch $S_2$ is adapted to be actuated by push button switch $S_3$, which is connected to an energizing coil K through a rectifier $D_1$ and resistance $R_1$. Switch $S_3$ is normally open whereas a second switch $S_4$, which is normally closed, is also connected to energizing coil K through rectifier $D_1$ and resistance $R_2$. A capacitor $C_1$ is provided across coil K.

The positive and neutral terminals of a load L are connected to second switch $S_2$ whereas the earth terminal of load L is connected to the earth terminal E of the device and having an insulating resistor $R_3$. Further, the coil K is connected to the load L through a transistor $T_1$ and resistor $R_4$.

Upon actuating switch $S_1$ such that the arms $S_p$ and $S_n$ establish a contact with terminals $a_1$ and $a_2$ and push button switch $S_3$ is closed, current is adapted to flow to resistor $R_1$ and rectifier $D_1$ and whereby coil K is energized. The result of the energization of coil K is that the switch $S_2$ is closed and whereby the load L is connected to the power source. The push button switch $S_3$ is released immediately upon actuation. However, since the switch $S_4$ is now closed, current flows to the energizing coil K through switch $S_4$ which is normally closed.

Considering that no body leakage occurs in the load L, transistor $T_1$ is not biased and hence coil K remains in an energized state. Thus, for disconnecting the load L from the power source, the switch $S_1$ is opened. However, considering that a body leakage is present in the load L, such a potential or voltage is sensed by resistor $R_4$ and which biases transistor $T_1$. Upon transistor $T_1$ being biased, the coil K becomes deenergized and whereby switch $S_2$ is opened and the load L is disconnected from the main power source.

Reference is now made to switch $S_1$ which besides capable of connecting the device to the power source also functions as a reversing switch. The arms $S_p$ and $S_n$ of switch $S_1$ is a two way reversing switch and which is capable of establishing a contact either with contacts $a_1$ and $a_2$ or with contacts $b_1$ and $b_2$ provided in said device. As shown in the drawings, an indicating bulb B is provided between the contact $b_1$ and the earth line. Considering that no fault lies in the polarity of the line connection for the power source, and the contact arms $S_p$ and $S_n$ of switch $S_1$ establish a contact with contacts $a_1$ and $a_2$, then the bulb is not illuminated. The contact $b_1$ is adapted to be connected with contact $a_2$ which is the neutral terminal of the device whereas the contact $b_2$ is adapted to be connected to the contact a, which is the positive terminal of the device. Thus, when the polarity of the line connection of the power source is correct, a small power does appear across the indicating bulb B. Since the power is negligible, the bulb B is not illuminated. However, if there is a fault in the line connection of the power source and whereby the phase line of the source is connected to the neutral terminal of the device and the neutral line of the source is connected to the positive terminal of the device, and upon closing the switch $S_1$ such that the arms $S_p$ and $S_n$ establish a contact with contacts $a_1$ and $a_2$, the bulb B illuminates and thereby providing a visual indication to an operator of such a fault. In such an instance, the arms $S_p$ and $S_n$ are reversed such as to establish a contact with contacts $b_1$ and $b_2$ and whereby the positive and neutral of the load are connected correctly to the positive and neutral contacts of the main source.

It will be apparent that the device of FIG. 1 is effective only with regard to leakages occurring in the body of a load. However, no protection is afforded by the device of FIG. 1 when a human body contacts an electrical conductor of and when current is flowing therethrough. Such a protection is afforded by the device of FIG. 2 which provides firstly protection against leakages occurring in the body of load and secondly against a human body receiving a substantial shock upon contacting a live electrical conductor of the load.

Figure 2:
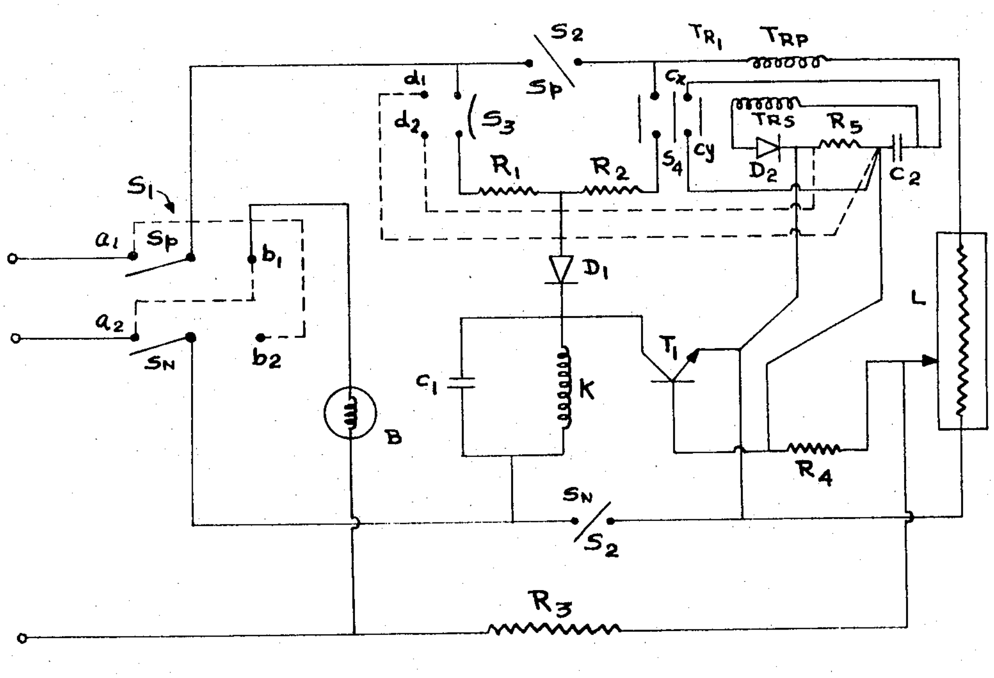
FIG. 2 shows another embodiment of the device of this invention.

The circuit of FIG. 2 for protection against body leakage in a load is similar in contruction and operation to that as illustrated in FIG. 1. Thus, for purposes of brevity, this part of the circuit is not described herein. Reference is now made to that part of the circuit provided for shock to a human body, when contacting a live electrical conductor of the load, and which consists of a current transformer $TR_1$. The primary winding $TR_p$ is connected to the switch $S_2$ whereas the secondary $TR_s$ is connected to the transistor $T_1$ through a rectifier $D_2$. Further, a resistor $R_5$ and a capacitor $C_2$ is connected to contacts $C_x$ and $C_y$ of a fourth switch $S_4$.

Upon closure of switches $S_1$ and $S_3$, the load L is adapted to be connected to the main power source and in a manner, as described with reference to FIG. 1. Thus, push button switch $S_3$ is momentarily closed whereby coil K is energized and closes switch $S_2$ and thus the circuit between the load L and the main supply source is completed. The switch $S_1$ remains in a closed position until the switch $S_4$ is opened or a body leakage appears in the load or a short circuit takes place upon a human body contacting a live conductor of the load. Considering if a leakage occurs in the load body, the switch $S_2$ is opened in a manner as already described with reference to FIG. 1.

However, reference is now made to the operation of the circuit upon a human body contacting a live conductor of the load. During normal conditions of the device, namely, when no short circuit occurs due to human body contacting a live conductor, a secondary voltage is induced in the secondary winding $TR_s$ and which is proportional to the load current. The voltage of the secondary winding $TR_s$ charges capacitor $C_2$. One capacitor $C_2$ is fully charged, no potential appears across resistance $R_5$ and hence does not operate transistor $T_1$. As shown in FIG. 2, resistance $R_5$ is connected also to transistor $T_1$. However, when a leakage occurs due to a human body contacting a live conductor, the secondary voltage increases resulting in an increase of the charge in capacitor $C_2$. Due to an increase in charge in capacitor $C_2$, a potential appears across resistor $R_5$ and which biases transistor $T_1$ and thus deenergizes coil K and whereby switch $S_2$ is opened.

A disadvantage which is apparent from such a circuit is with regard to the switching on operation of the device. When the device is switched on, and whereby the load is connected to the power source, an instantaneous voltage is induced in the secondary winding $TR_s$ of transformer TR and which said voltage appears across resistance $R_5$ resulting thereby in the biasing of transistor $T_1$ and the deenergization of coil K and the opening of switch $S_2$. In order to avoid such an opening of switch $S_2$ in the switching on operation of the device, the push button switch $S_3$ may be kept in a pressed state for a short period, such as half a minute, until the capacitor $C_2$ is fully charged. Alternatively, and as shown in phantom lines, the resistor $R_5$ may be connected to the contacts $d_1$, $d_2$ of switch $S_3$ and such that during the closure of switch $S_3$, resistor $R_3$ is short circuited.

Another apparent disadvantage that may appear with such a device is when the said device is used with loads of different values. Considering that the device was first used with a load of a high value and thereafter used with a load of a lower value, the capacitor $C_2$ would be charged at a higher potential by the first load, and hence no voltage would appear across resistance $R_5$, even when a human body contacts a live conductor and in the instance of when the device is connected to the second load and which is of a lower value. In order to obviate such a disadvantage, the capacitor $C_2$ connected to contacts $C_x$ and $C_y$ of switch $S_4$ and such that capacitor $C_2$ can be short circuited by opening switch $S_4$ and before connecting the device from one load to another. The device is now ready to be connected to a different load.

Figure 3:
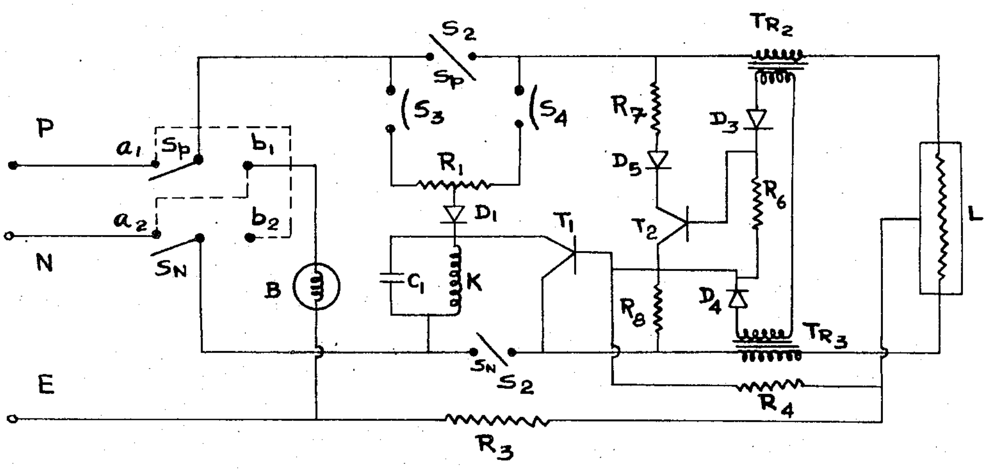
FIG. 3 shows still another embodiment of the device.

Reference is now made to FIG. 3 and wherein an amplifier is incorporated in the device of the present invention and for purposes of increasing the sensitivity. The circuit of FIG. 1, for protection against leakage in the load body, is incorporated in the device of FIG. 3. The circuit for protection against a shock being imparted to a human body upon contacting a live conductor in the load consists of a first current transformer $TR_2$ provided in the phase line and a second current transformer $TR_3$ provided in the neutral line of the device. The secondary of transformer $TR_2$ is connected to a sensing resistor $R_6$ through a diode $D_3$ whereas the secondary of transformer $TR_3$ is connected to resistance $R_6$ through diode $D_4$. Resistance $R_6$ is a biasing or sensing resistor for transistor $T_2$. Transistor $T_2$ is coupled to transistor $T_1$ whereas rectifier $D_5$ and resistances $R_7$ and $R_8$ are connected to the transistor $T_2$ in the normal manner. The secondary of transformer $TR_2$ is connected in an opposed direction to the secondary of transformer $TR_3$. When the voltages induced in the secondary windings of transformers $TR_2$ and $TR_3$ are equal to each other, and which is the condition when no contact takes place between a human body and a live conductor, no potential is developed across resistance $R_6$. However, upon a human body contacting a live conductor in the load circuit, the voltages induced in the secondary windings of transformers $TR_2$ and $TR_3$ are no longer equal and whereby a potential appears across resistance $R_6$ and which is amplified by transistor $T_1$ and the circuit is thereafter switched off in a manner as already described with reference to FIG. 1.

Figure 4:
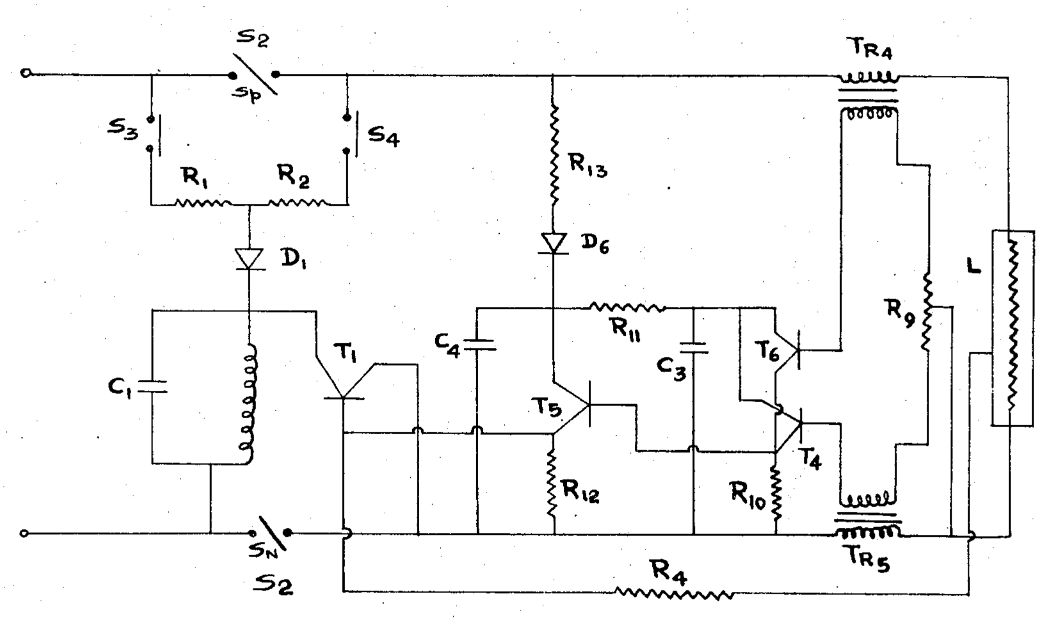
FIG. 4 shows a further embodiment of the device.

Reference is now made to FIG. 4 and which illustrates a circuit having an amplifier for higher sensitivity. The circuit of FIG. 4 similarly incorporates the circuit for protection against leakage in the body load, and as already described with reference to FIG. 1. The circuit for preventing a shock to a human body, upon contacting a live conductor of the load, consists of a first current transformer $TR_4$ and provided in the phase line and a second current transformer $TR_5$ provided in the neutral line. The secondary of each of the transformers $TR_4$ and $TR_5$ are connected to a sensing resistor $R_9$. The drawing illustrates resistor $R_9$ to be a variable potentionecter. In actual operation of the device, the resistor $R_9$ is of a fixed value. The purpose of making resistance $R_9$ variable is for purposes of adjusting the balance or sensitivity during the assembly of the circuit. A transistor $T_3$ is connected to the secondary of transformer $TR_4$ whereas a transistor $T_4$ is connected to the secondary of transformer $TR_5$. Transistors $T_3$ and $T_4$ are coupled to an emitter follower transistor $T_5$ through coupling capacitor $C_3$ and resistor $R_{11}$. Resistors $R_{12}$ and $R_{13}$ and rectifier $D_6$ are connected to transistor $T_5$ in the normal manner. A capacitor $C_4$ is provided with resistor $R_{11}$ whereas resistance $R_{10}$ is connected to transistor $T_4$. The emitter follower transistor $T_5$ is connected to the sensing transistor $T_1$.

Transistors $T_3$ and $T_4$ operate as a balanced amplifier. Thus, when the load L is connected to the power source through the circuit or device of FIG. 4, and considering that there is no leakage through a human body, the voltages induced in the secondary of transformers of $TR_4$ and $TR_5$ are equal and hence neither of the transistors $T_3$ or $T_4$ conducts. However, if there is a leakage, the voltage in either one of secondary windings of transformers $TR_4$ or $TR_5$ will be of a higher value, and which voltage appears across sensing resistor $R_9$ and which biases transistors $T_3$ and $T_4$. The signal from the balanced amplifier consisting of transistors $T_3$ and $T_4$ is fed to the emitter follower amplifier consisting of transistor $T_5$, which is amplified and thereafter fed to sensing transistor $T_1$. The circuit then operates in a manner as described with reference to FIG. 1.

What is claimed is:

1. A device adapted to disconnect a load from a power source upon a leakage occurring in said load comprising an energizing coil adapted to be connected to a main source, a first switch capable of being closed upon the energization of said coil and thereby connecting a load to the power source, a transistor connected to the energizing coil and having a biasing means, said transistor and biasing means adapted to be connected to said load, such that upon a leakage occurring in the body of the load the transistor is biased and thereby deenergizes said coil and whereby said first switch is opened, and means for preventing a shock to a human body upon contacting a live conductor of the load and which comprises a current transformer connected to said first switch, the secondary of said transformer connected to said transistor through a second biasing means such that said transistor is capable of being biased by said first and/or second biasing means and whereby the coil is deenergized and the first said switch opened.

2. A device as claimed in claim 1 comprising a second switch connected between the energizing coil and the phase terminal of said device and whereby upon actuation of the second switch, the coil is energized and said first switch is closed.

3. A device as claimed in claim 1 wherein said second switch is a push button switch, a third switch provided in parallel to said switch, said third switch being normally closed and connected between the energizing coil and said first switch.

4. A device as claimed in claim 1 wherein said second biasing means is connected across the secondary of said transformer and consists of a resistor and capacitor in series.

5. A device as claimed in claim 4 wherein means are provided for short circuiting said resistor and capacitor.

6. A device adapted to disconnect a load from a power source upon a leakage occurring in said load comprising an energizing coil adapted to be connected to a main source, a first switch capable of being closed upon the energization of said coil and thereby connecting a load to the power source, a transistor connected to the energizing coil and having a biasing means, said transistor and biasing means adapted to be connected to said load and such that upon a leakage occurring in the body of the load, the transistor is biased and thereby deenergizes said coil and whereby said first switch is opened, and means for preventing a shock to a human body upon contacting a live conductor of the load and which consists of a first current transformer provided in the phase line, a second current transformer provided in the neutral line, the secondaries of said transformers connected to a balanced amplifier through a sensing means, said balanced amplifier connected to said first transistor through an emitter follower amplifier.

7. A device as claimed in claim 6 wherein a single sensing means is provided for said first and second transformers.

8. A device adapted to disconnect a load from a power source upon a leakage occurring in said load comprising an energizing coil adapted to be connected to a main source, a first switch capable of being closed upon the energization of said coil and thereby connecting a load to the power source, a transistor connected to the energizing coil and having a biasing means, said transistor and biasing means adapted to be connected to said load such that upon a leakage occurring in the body of the load, the transistor is biased and thereby deenergizes said coil and whereby said first switch is opened, and means for preventing a shock to a human body upon contacting a live conductor of the load comprising a first and second current transformer provided in the phase and neutral line respectively, a second transistor connected to the secondaries of said transformers through a second sensing means, said second transistor coupled to said first transistor, such that upon a leakage occurring in the conductor the second transistor is biased.

9. A device as claimed in claim 7 wherein the secondary of said first transformer is provided in an opposed relation to the secondary of said second transformer.

10. A device as claimed in claim 7 wherein single sensing means is provided and consists of a resistor.

* * * * *